US008755351B2

(12) United States Patent
Koyanagi

(10) Patent No.: US 8,755,351 B2
(45) Date of Patent: Jun. 17, 2014

(54) WIRELESS LINE USAGE STATUS MONITORING METHOD AND DEVICE

(75) Inventor: Kenichiro Koyanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 523 days.

(21) Appl. No.: 12/691,839

(22) Filed: Jan. 22, 2010

(65) Prior Publication Data

US 2010/0118731 A1 May 13, 2010

Related U.S. Application Data

(63) Continuation of application No. PCT/JP2007/065082, filed on Aug. 1, 2007.

(51) Int. Cl.
*H04W 4/00* (2009.01)
*H04J 3/06* (2006.01)

(52) U.S. Cl.
USPC .......................................... 370/331; 370/350

(58) Field of Classification Search
USPC ............ 370/324, 331, 350; 375/141; 455/130
See application file for complete search history.

(56) References Cited

U.S. PATENT DOCUMENTS

| 5,754,958 A | 5/1998 | Tsuji et al. |
| 5,845,212 A | 12/1998 | Tanaka |
| 6,937,640 B2 * | 8/2005 | Yun et al. ....................... 375/141 |
| 2002/0154609 A1 * | 10/2002 | Saito et al. .................... 370/324 |
| 2004/0023627 A1 * | 2/2004 | Osaki et al. .................... 455/130 |
| 2004/0043767 A1 | 3/2004 | Tsutsumi et al. |

FOREIGN PATENT DOCUMENTS

| JP | 8-168070 | 6/1996 |
| JP | 9-107573 | 4/1997 |
| JP | 2000-102055 | 4/2000 |
| JP | 2004-88592 | 3/2004 |
| JP | 2005-229417 | 8/2005 |
| JP | 2007-74239 | 3/2007 |

OTHER PUBLICATIONS

Notification of Reasons for Refusal dated Mar. 27, 2012, from corresponding Japanese Application No. 2009-525241.
International Search Report dated Nov. 20, 2007, from the corresponding International Application.

* cited by examiner

*Primary Examiner* — Mark Rinehart
*Assistant Examiner* — Gbemileke Onamuti
(74) *Attorney, Agent, or Firm* — Katten Muchin Rosenman LLP

(57) ABSTRACT

For monitoring a wireless line usage status more effectively, a mobile station extracts a synchronizing signal of each of frames received from a plurality of base stations and a known signal transmitted together with transmission data within a time slot in which the transmission data are included but not transmitted within a time slot in which the transmission data are not included. The mobile station then measures a reception power of the synchronizing signal and a reception power of the known signal for each base station. And the mobile station determines a usage status of a wireless line of each base station based on the reception power of the synchronizing signal and the reception power of the known signal.

5 Claims, 17 Drawing Sheets

WIRELESS LINE USAGE STATUS MONITORING METHOD AND DEVICE

CROSS-REFERENCE TO RELATED APPLICATION

This application is a continuation of International Application PCT/JP2007/65082 filed on Aug. 1, 2007, the contents of which are herein wholly incorporated by reference.

FIELD

The present invention relates to a wireless line or channel (radio link or channel) usage status monitoring method and device in a mobile communication system.

BACKGROUND

FIG. 13 illustrates an arrangement of a mobile communication system generally known in the art. This mobile communication system 1 is composed of a mobile station 10, base stations 20_1-20_n (hereinafter, occasionally represented by a base station 20) respectively communicating with the mobile station 10 through wireless lines RL1-RLn (hereinafter, occasionally represented by a wireless line RL) and network connecting devices 30_1-30_m connected to the base stations 20 with a wired line WL to relay signals between the base stations 20 and a communication network NW.

It is to be noted that in order to effectively use the wireless line RL with a restricted frequency band or the like, there is a method by which the mobile station 10 or the base stations 20 monitor a wireless line usage rate (using or use rate) indicating a usage status of the wireless lines.

Related art examples [1] and [2] for the monitoring technology will now be described referring to FIGS. 14-17:

Related Art Example [1]

FIGS. 14-16

The related art mobile station 10 depicted in FIG. 14 includes a transmitting/receiving portion 11 for transmitting/receiving a frame FR (including data signal and various kinds of control signals) to/from the wireless line RL provided by the base stations 20 through an antenna ANT, a measuring portion 12 for measuring a reception signal quality RQ of the wireless line RL based on a specified signal within the frame FR and a control portion 13 for controlling and signal processing with the transmitting/receiving portion 11 and the measuring portion 12.

The related art base stations 20 depicted in FIG. 15 includes a transmitting/receiving portion 21 for transmitting/receiving the frame FR to/from the mobile station 10 through the antenna ANT, a wired line joint portion 22 connected to a wired line WL to transmit/receive the number of mobile stations during a call connection (hereinafter, occasionally referred to as a call connection number) NUM to/from other base stations and a control portion 23 for controlling and signal processing with the transmitting/receiving portion 21 and the wired line joint portion 22.

In operation, each control portion 23 within the base stations 20_1-20_n depicted in FIG. 16 periodically collects a call connection number of each of the base stations 20_1-20_n through each wired line joint portion 22 and calculates wireless line usage rates UR1-URn (hereinafter, occasionally represented by a usage rate UR) of the base stations 20_1-20_n based on the call connection number, whereby the wireless usage rates UR1-URn are to be shared between the base stations 20_1-20_n (step T1). It is to be noted that there is also a case where the base stations 20_1-20_n measure a frame transmission amount within the wireless line RL, an average transmission rate of the wireless line RL or the like, base on which the wireless line usage rate UR is calculated.

Meanwhile, there occurs a potential event where as the wireless line usage rate UR increases, the base stations can not accept a call request or a handover request from the mobile station and the transmission rate per mobile station is deteriorated in case of a communication system in which the wireless line is shared between a plurality of mobile stations.

For this event, assuming that the mobile station 10 is call connected to the base station 20_1 as depicted by dotted lines in FIG. 16, the control portion 23 within the base station 20_1 informs the mobile station 10 of the wireless line usage rates UR1-URn through the transmitting/receiving portion 21, thereby promoting implementation of a handover based on the wireless line usage rates UR1-URn (step T2).

Upon receiving the wireless line usage rates UR1-URn, the measuring portion 12 in the mobile station 10 measures the reception signal qualities RQ1-RQn of the wireless lines of the base stations 20_1-20_n to be provided to the control portion 13 (step T3).

The control portion 13 determines whether or not a handover to the base stations 20_2-20_n is implementable based on the reception signal quality RQ1 of the base station 20_1 during the call connection and the reception signal qualities RQ2-RQn of the adjacent base stations 20_2-20_n (step T4).

Then the control portion 13 compares the wireless line usage rates of the base stations in which the handover is determined to be implementable and determines a base station, with the lowest wireless line usage rate, destined to be handed over, that is a handover destination base station (step T5).

Now assuming that the wireless line usage rate UR2 be the lowest, the control portion 13 determines to implement the handover to the base station 20_2 and notifies the handover request REQ to the base station 20_1 through the transmitting/receiving portion 11 (step T6).

Having received the handover request REQ, the base station 20_1 provides a handover command CMD to the mobile station 10 to grant the handover to the base station 20_2 (step T7), whereby the mobile station 10 is to have a call connection with the base station 20_2 as depicted by dot and dash lines in FIG. 16.

In this way, the mobile stations are call connected to the base stations with lower wireless line usage rates in a dispersed fashion, thereby preventing the wireless line usage rates from being increased (see e.g. Japanese Laid-open Patent Publication No. 2005-229417).

Also, as indicated in the following related art example [2], there is a method of determining a handover destination of a mobile station mainly led by a base station.

Related Art Example [2]

FIG. 17

As depicted in FIG. 17, the base stations 20_1-20_n share the wireless line usage rates UR1-URn as with the above related art example [1] (step T1). At this time, the base station 20_1 during the call connection with the mobile station 10 compares the wireless line usage rates UR1-URn, whereby the mobile station 10 determines a base station to be handed over (or base station candidate destined to be handed over), different from the above related art example [1] (step T8).

Now assuming that the adjacent base station 20_2 be determined to be handed over, the base station 20_1 provides a measurement instruction of reception signal quality INS2 to the mobile station 10 to measure the wireless line reception signal quality RQ1 of the base station 20_1 itself and the wireless line reception signal quality RQ2 of the base station 20_2 (step T9). It is to be noted that when the base stations as a handover candidate are determined at the above step T8, the base station 20_1 instructs the mobile station 10 to measure the wireless line reception signal quality of each base station as a handover candidate.

The mobile station 10 having received the reception signal quality measurement instruction INS2 measures the reception signal qualities RQ1 and RQ2 (step T10) and notifies the measurement results to the base station 20_1 (step T11).

When the base station determines that the mobile station 10 can implement the handover to the base station 20_2 (step T12), the base station 20_1 provides the handover command CMD to the mobile station 10 to be forcibly handed over to the base station 20_2 (step T13), whereby the mobile station 10 is to have a call connection with the base station 20_2 as depicted by dot and dash lines in FIG. 17.

This case can also prevent the wireless line usage rate from being increased as with the above related art example [1].

It is to be noted that as a reference example, there is a mobile communication system in which a base station notifies a mobile station of a reception signal power and a reception signal quality measured for an uplink electric wave and a transmission signal power of a downlink electric wave, so that the mobile station manages in an integrated fashion the state of the uplink electric wave and the state of the downlink electric wave based on the reception signal power, reception signal quality and transmission signal power notified as well as a reception signal power and a reception signal quality measured for the downlink electric wave to carry out a handover control, thereby reducing the loads of the base stations (see e.g. Japanese Laid-open Patent Publication No. 9-107573).

The above related art examples [1] and [2] have a problem that resources of wired lines are wasted since the wireless line usage rates are shared through the wired lines connecting the base stations mutually, so that particularly such a waste is increased as the shared wireless line usage rates are updated in a shorter term.

Also the above related art example [1] has a problem that since the wireless line usage rates are required to be notified from the base stations during the call connection in order to make the mobile stations determine the base stations to be handed over, so that this notification itself causes an increase of the wireless line usage rate in which particularly such an increase is enlarged as the number of the adjacent base stations increases.

SUMMARY

[1] According to an aspect of the invention, a wireless line usage status monitoring method (or device) includes: extracting (or an extracting portion extracting) a synchronizing signal of each of frames received from a plurality of base stations and a known signal transmitted together with transmission data within a time slot in which the transmission data are included but not transmitted within a time slot in which the transmission data are not included; measuring (or a measuring portion measuring) a reception power of the synchronizing signal and a reception power of the known signal for each base station; and determining (or a determining portion determining) a usage status of a wireless line of each base station based on the reception power of the synchronizing signal and the reception power of the known signal.

It is to be noted that the reception power of the above known signal may be replace by a reception power of a time slot in case where the base stations transmit time slots (including data signal and the known signal) with a fixed power so that the mobile station can identify the reception power for each base station without using the known signal.

[2] In the above [1], the reception power of the known signal may include an average reception power or a total reception power within a single frame.

[3] Also, in the above [1], the extracting (or the extracting portion) may include: measuring (or a measuring portion measuring) a reception signal quality of a wireless line of each base station; determining (or a determining portion determining) handover destination candidate base stations based on the reception signal quality; and extracting (or an extracting portion extracting) the synchronizing signal and the known signal of the frames only from the handover destination candidate base stations and a base station during a call connection.

[4] Also, in the above [1], the determining (or the determining portion) may include calculating (or a calculating portion calculating) a wireless line usage rate as indicating the usage status from a ratio of the reception power of the synchronizing signal to the reception power of the known signal; and the method (or the device) may further include selecting (or a selecting portion selecting) a base station with the wireless line usage rate being lowest as a handover destination base station.

[5] In the above [4], the selecting (or the selecting portion) may select, as the handover destination base station, a base station with the wireless line usage rate being lowest and lower than a specified value or a base station with the wireless line usage rate being lowest and with a wireless line usage rate difference with respect to a base station during a call connection exceeding a specified threshold value.

[6] Also, in the above [1], the method (or the device) may further include measuring (or a measuring portion measuring) a wireless line reception signal quality for each base station; calculating (or a calculating portion calculating) an effective transmission rate of each wireless line from the reception signal quality and the usage status; and selecting (or a selecting portion selecting) the base station with the effective transmission rate being highest as a handover destination base station.

[7] In the above [6], the selecting may select, as the handover destination base station, a base station with the effective transmission rate being highest and exceeding a specified threshold value or a base station with the effective transmission rate being highest and with an effective transmission rate difference with respect to a base station during a call connection exceeding a specified threshold value.

[8] According to a further aspect of the invention, a wireless line usage status monitoring method may include: extracting, when frames are concurrently received from a plurality of base stations, a synchronizing signal of a frame received from one base station and a known signal transmitted together with transmission data within a time slot in which the transmission data are included but not transmitted within a time slot in which the transmission data are not included; measuring a reception power of the synchronizing signal and a reception power of the known signal for each base station as well as an interference power with respect to the synchronizing signal and an interference power with respect to the known signal; first determining a wireless line usage status of the one base station based on the reception power of the synchronizing signal and the reception power of the known signal; and second determining a wireless line usage status of a second base station based on the interference power with respect to the synchronizing signal and the interference power with respect to the known signal.

[9] In the above [8], if the second base station includes a plurality of base stations, the second determining may include calculating a total wireless line usage rate of the second base station as indicating the wireless line usage status of the second base station from a ratio of the interference power of the synchronizing signal to the interference power of the known signal.

[10] Also, in the above [8], the reception power of the known signal may include an average reception power or a total reception power within a single frame and the interference power with respect to the known signal may include an average interference power or a total interference power within a single frame.

[11] Also, in the above [8], the extracting may include: measuring a wireless line reception signal quality of the second base station; determining handover destination candidate base stations based on the reception signal quality; and extracting the synchronizing signal and the known signal only in presence of the handover destination candidate base stations.

[12] Also, in the above [8], the first determining may include calculating a wireless line usage rate of the one base station as indicating the wireless line usage status of the one base station from a ratio of the reception power of the synchronizing signal to the reception power of the known signal, and the second determining may include calculating a wireless line usage rate of the second base station as indicating the wireless line usage status of the second base station from a ratio of the interference power with respect to the synchronizing signal to the interference power with respect to the known signal; and the method may further include third measuring a wireless line reception signal quality of the second base station when the wireless line usage rate of the second base station is lower than the wireless line usage rate of the one base station; and selecting a base station with a best usage rate as a handover destination base station.

[13] Also, in the above [12], the third measuring may measure the reception signal quality when the wireless line usage rate of the second base station is lower than the wireless line usage rate of the one base station and a difference between the usage rates exceeds a specified threshold value.

The object and advantages of the embodiment will be realized and attained by means of the elements and combinations particularly pointed out in the claims.

It is to be understood that both the foregoing general description and the following detailed description are exemplary and explanatory and are not restrictive of the invention as claimed.

DESCRIPTION OF EMBODIMENTS

Embodiments [1] and [2] of a wireless line usage status monitoring method and device will now be described referring to FIGS. 1-12.

Embodiment [1]

FIGS. 1-11

Figure 1:
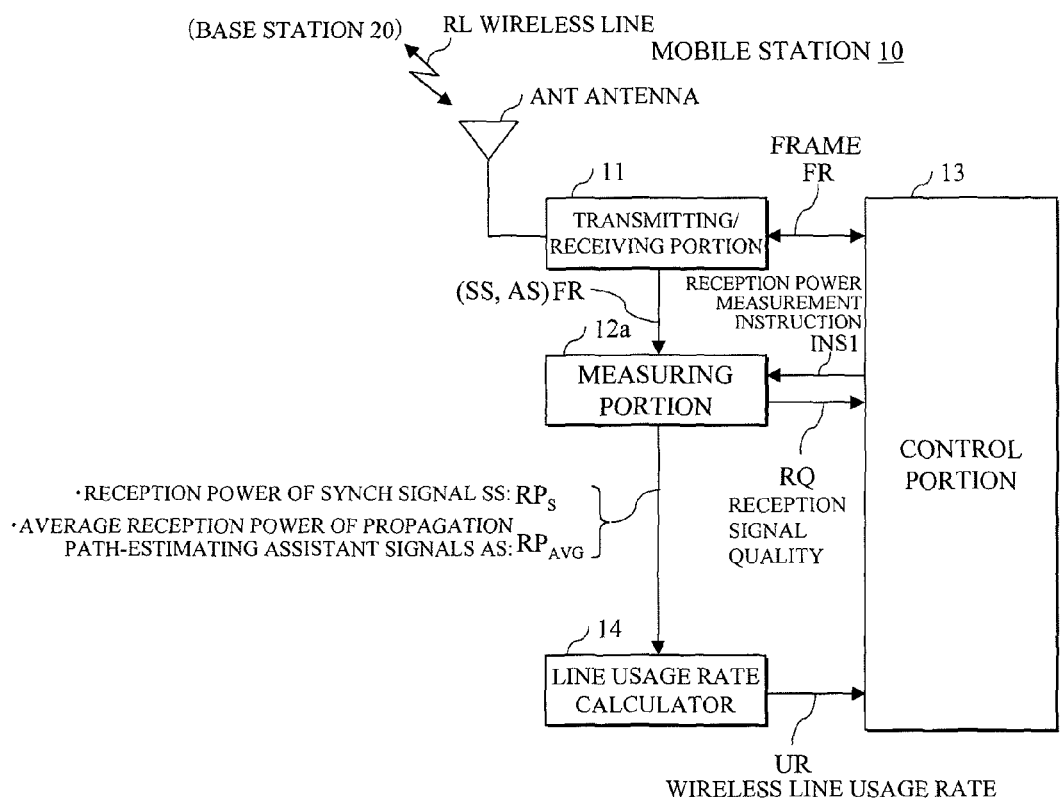
FIG. 1 is a block diagram depicting an arrangement of an embodiment [1] of a wireless line usage status monitoring method and device.

*Arrangement: FIG. 1

Figure 14:
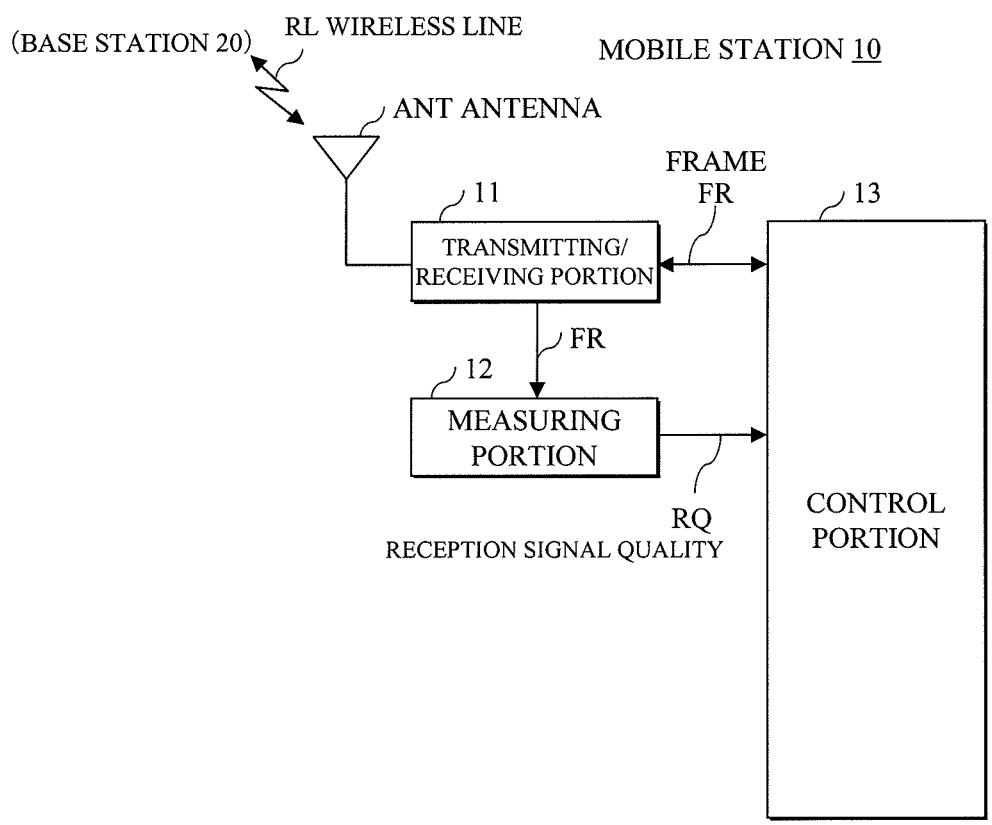
FIG. 14 is a block diagram depicting an arrangement of a related art mobile station.
Figure 15:
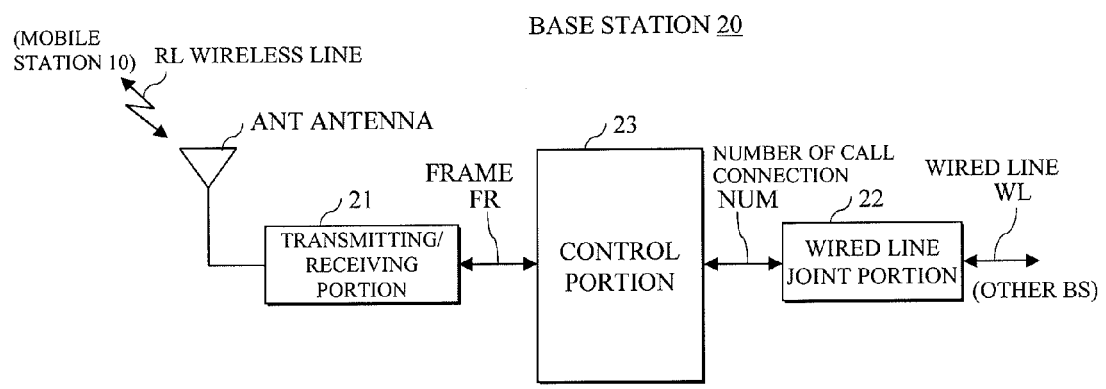
FIG. 15 is a block diagram depicting an arrangement of a related art base station.

The mobile station 10 according to this embodiment [1] as depicted in FIG. 1 replaces the measuring portion 12 in the related art example depicted in FIG. 14 with a measuring portion 12a for measuring a reception power $RP_S$ of a synchronizing signal SS and an average reception power $RP_{AVG}$ of propagation path-estimating assistant signals AS in a frame FR in accordance with a power measurement instruction INS1 from the control portion 13 in addition to the reception signal quality RQ, and is further added with a line usage rate calculator 14 for calculating a wireless line usage rate UR as indicating a usage status of the wireless line RL from both of the powers $RP_S$ and $RP_{AVG}$.

It is to be noted that the above noted synchronizing signal SS is positioned at the beginning of the TDMA (Time Division Multiple Access) frame and transmitted with a fixed power and a known pattern from the base station, serving to synchronize the base station with the mobile station.

And the above noted propagation path-estimating assistant signals AS is contained within a time slot of the frame as the aforementioned known signal, transmitted with a fixed power and a known pattern from the base station and is used by the mobile station for performing compensations of amplitude and phase as well as error corrections or the like with respect to data signal (not depicted) within the frame.

It is to be noted that the above time slot may be occupied by a single mobile station or shared with a plurality of mobile stations.

*Operation Example

FIGS. 2-6

Figure 2:
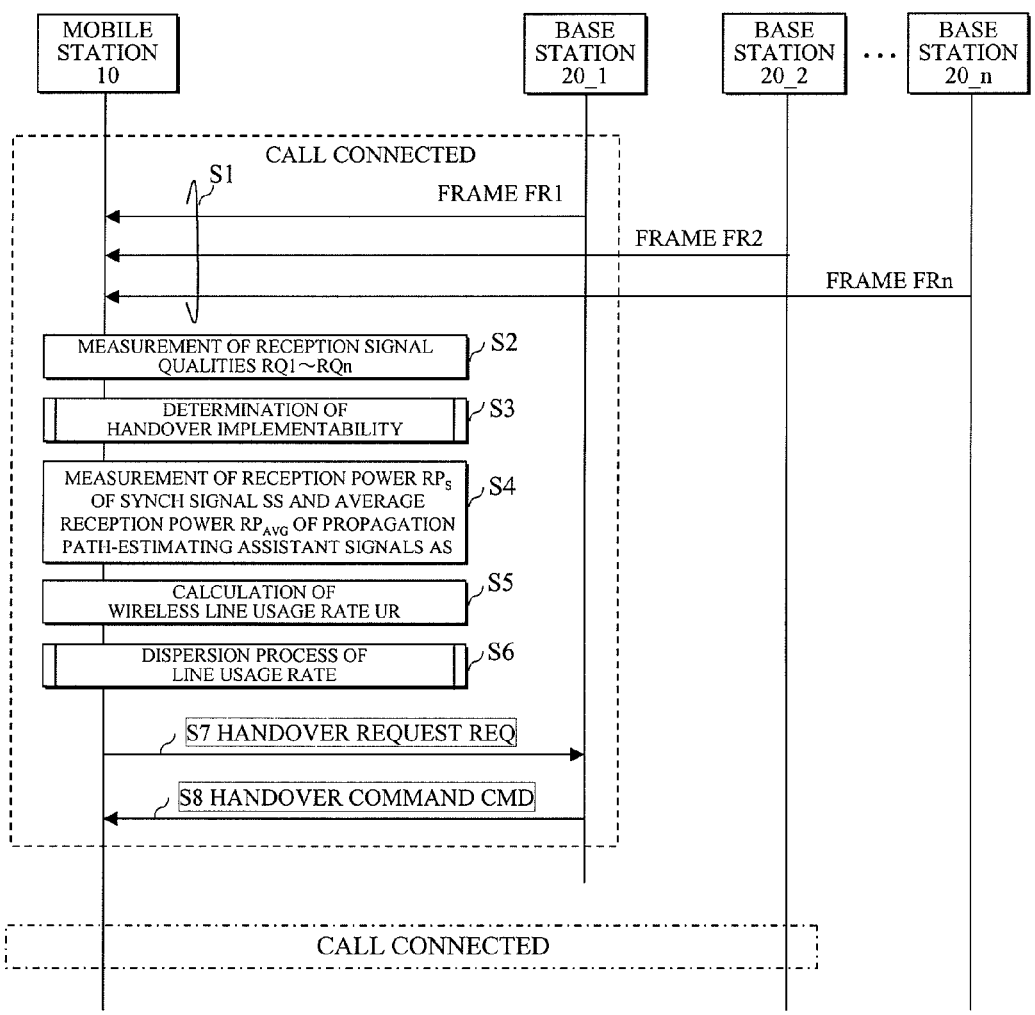
FIG. 2 is a sequence diagram depicting an operation of an embodiment [1] of a wireless line usage status monitoring method and device.

As depicted in FIG. 2, the transmitting/receiving portion 11 forming the mobile station 10 provides frames FR1-FRn respectively received from the base stations 20_1-20_n in the mobile communication system to the measuring portion 12a (step S1), where the frame FR is also provided to the control portion 13 while the description is omitted, so that a various kinds of communication processings are executed according to the contents of the data signal or the control signal within the frame FR.

As with the measuring portion 12 depicted in FIG. 14, the measuring portion 12a measures the reception signal qualities RQ1-RQn of the wireless lines of the base stations 20_1-20_n respectively from the frames FR1-FRn to be provided to the control portion 13 (step S2).

The control portion 13 executes a handover implementability determination processing based on the reception signal qualities RQ1-RQn (step S3).

Figure 3:
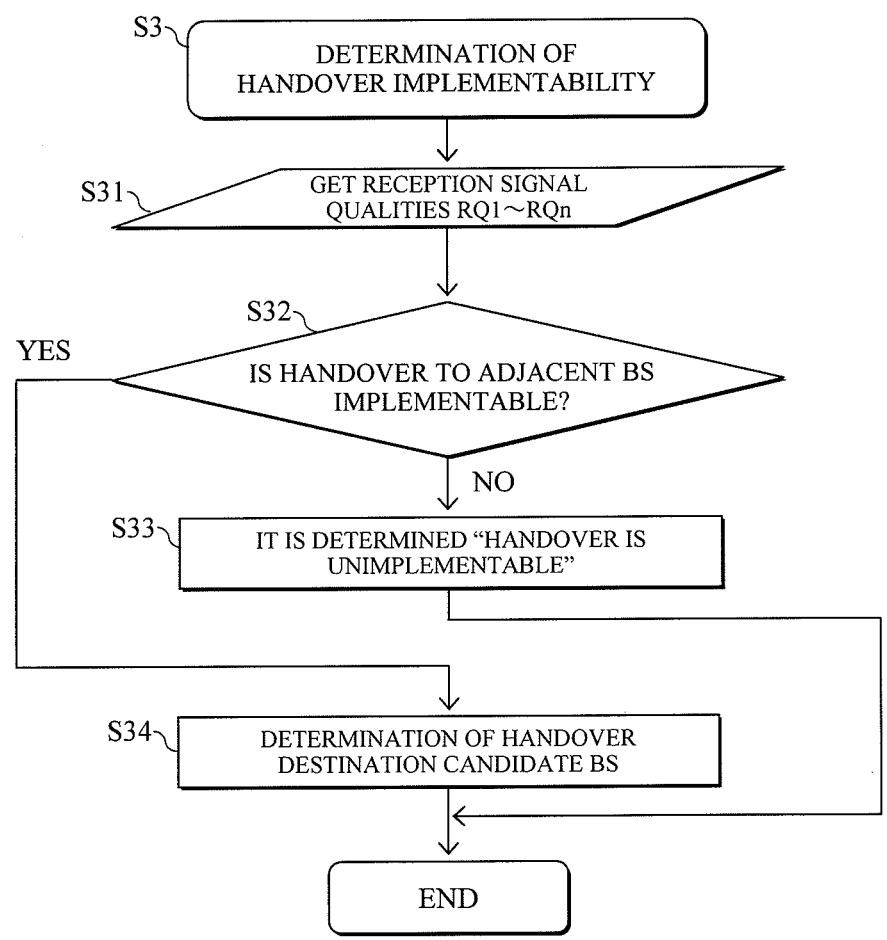
FIG. 3 is a flowchart depicting a handover implementability determination process in an embodiment [1] of a wireless line usage status monitoring method and device.

Namely, as depicted in FIG. 3, when the reception signal qualities RQ1-RQn are received (step 31), the control portion 13 compares in order the reception signal quality RQ1 of the base station 20_1 during the call connection and the reception signal qualities RQ2-RQn of the adjacent base stations 20_2-20_n to determine whether or not a handover to the base stations 20_2-20_n is implementable (step S32).

It is to be noted that the control portion 13 may be adapted to determine that the handover is implementable only if the reception signal qualities RQ2-RQn exceeds a specified threshold value or the difference between the reception signal qualities RQ2-RQn and the reception signal quality RQ1 exceeds a specified threshold value.

At step S32, if the control portion 13 determines that the handover is unimplementable, the mobile station 10 will not perform the processings at step S4 and the following steps depicted in FIG. 2 (step S33).

On the other hand, if the control portion determines that the handover is implementable, the mobile station 10 determines the base station as a base station as a handover destination candidate (step S34).

Now assuming that only the base station 20_2 be determined as a handover destination candidate base station, the control portion 13 provides the power measurement instruction INS1 to the measuring portion 12a to measure the reception power $RP_S$ of the synchronizing signal and the average reception power $RP_{AVG}$ of the propagation path-estimating assistant signals AS with regard to the frames FR1 and FR2 received from the base stations 20_1 and 20_2, respectively (step S4).

Figure 4A:
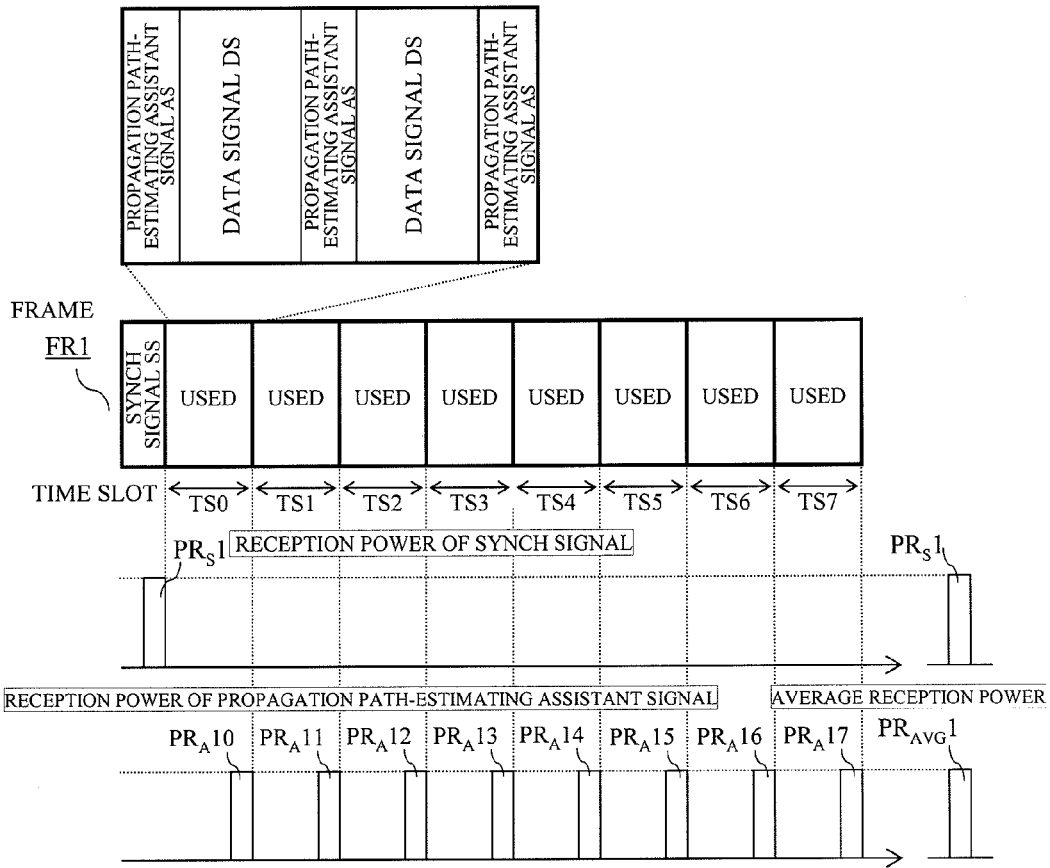
FIG. 4 is a block diagram depicting a reception power measuring operation in an embodiment [1] of a wireless line usage status monitoring method and device.

The measuring portion 12a having received the power measurement instruction INS1 measures a reception power $RP_S1$ of the synchronizing signal SS within the frame FR1 as depicted in FIG. 4A. Then the measuring portion 12a measures an average reception power (reception power of the known signal) $RP_{AVG}1$ of the propagation path-estimating assistant signals AS included in the time slots TS0-TS7 following the synchronizing signal SS.

In this case, all of the time slots TS0-TS7 are used for the transmission of the data signal DS as depicted, so that the measuring portion 12a measures reception powers $RP_A10$-$RP_A17$ of the propagation path-estimating assistant signals AS and calculates the average reception power $RP_{AVG}1$ from the reception powers $RP_A10$-$RP_A17$ to be provided to the line usage rate calculator 14.

Figure 4B:
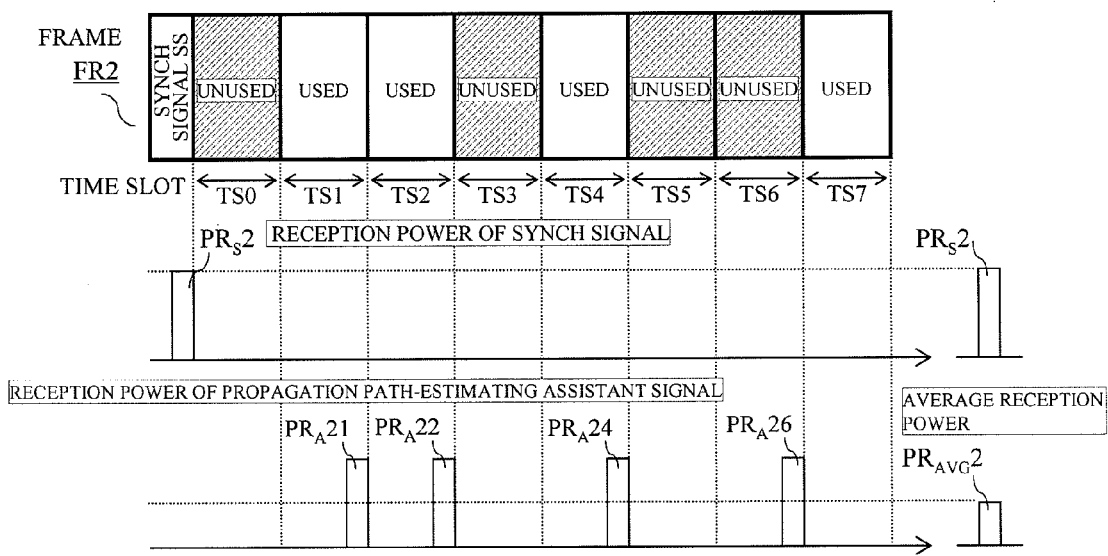

As depicted in FIG. 4B, the measuring portion 12a measures a reception power $RP_S2$ of the synchronizing signal SS and an average reception power $RP_{AVG}2$ of the propagation path-estimating assistant signals AS with respect to the frame FR2 as well in the same manner as the above, to be provided to the line usage rate calculator 14, where as depicted by oblique lines in FIG. 4B in the frame FR2 the time slots TS0, TS3, TS5 and TS6 are not used for the transmission of the data signal DS, so that the average reception power $RP_{AVG}2$ is measured as a value lower than the average reception power $RP_{AVG}1$.

It is to be noted that the reception powers $RP_S1$ and $RP_S2$ vary depending on the distance between the mobile station 10-the base station 20 regardless of the time slots TS0-TS7 being used/unused.

The line usage rate calculator 14 having received the average reception powers $RP_{AVG}1$ and $RP_{AVG}2$ calculates a wireless line usage rate UR1 of the base station 20_1 and a wireless line usage rate UR2 of the base station 20_2 in accordance with the following Equations (1) and (2) (step S5):

wireless line usage rate $UR1$=average reception power $RP_{AVG}1$/reception power $RP_S1$  Eq. (1)

wireless line usage rate $UR2$=average reception power $RP_{AVG}2$/reception power $RP_S2$  Eq. (2)

Figure 5:
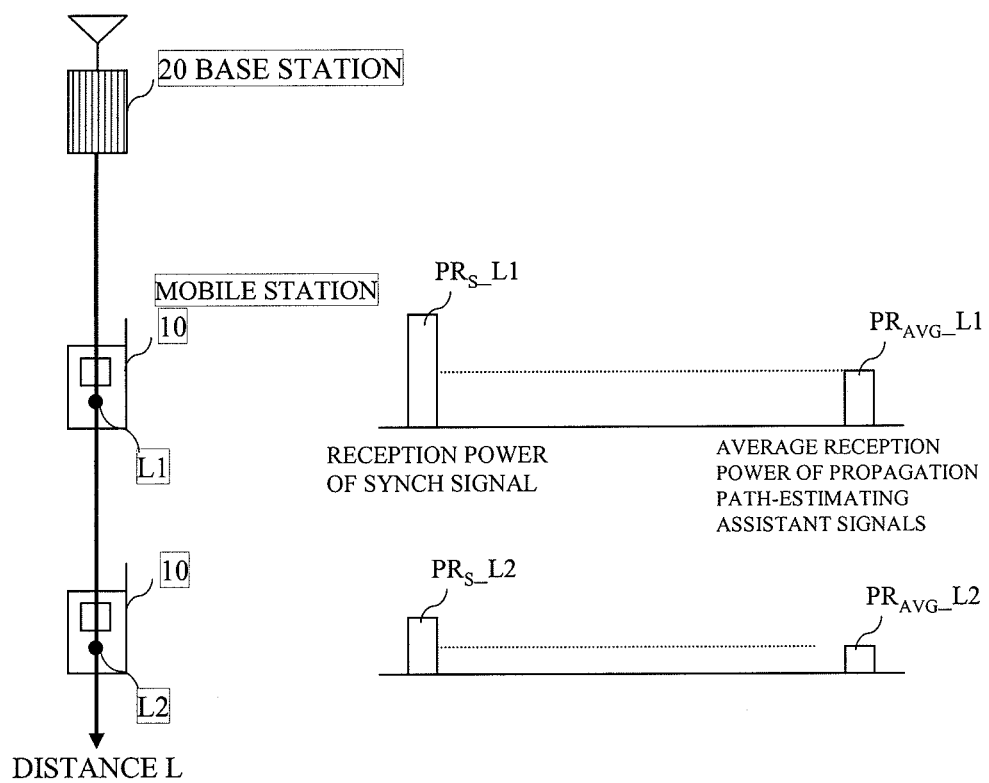
FIG. 5 is a block diagram depicting a reception power variation characteristic depending on a distance between a mobile station-base station used in an embodiment [1] of a wireless line usage status monitoring method and device.

The reason why the wireless line usage rate UR is calculated from the ratio of the reception power $RP_S$ of the synchronizing signal to the average reception power $RP_{AVG}$ of the propagation path-estimating assistant signals AS is that as depicted in FIG. 5 even though both of the powers $RP_S$ and $RP_{AVG}$ vary depending on the distance L between the mobile station 10-base station 20, the wireless line usage rate UR can be obtained as a unique value.

Namely, a reception power $RP_{S\_}L2$ and an average reception power $RP_{AVG\_}L2$ at the time when the distance L="L2 (>L1)" respectively become lower than a reception power $RP_{S\_}L1$ and an average reception power $RP_{AVG\_}L1$ at the time when the distance L="L1", where the ratio of the average reception value $RP_{AVG\_}L1$ to the reception power $RP_{S\_}L1$ is equal to the ratio of the average reception power $RP_{AVG\_}L2$ to the reception power $RP_{S\_}L2$. Therefore, the wireless line usage rate UR calculated at the above step S5 does not depend on the distance L between the mobile station 10-the base station 20.

It is to be noted that upon calculating the wireless line usage rate UR, a total reception power of the propagation path-estimating assistant signals AS may be substituted for the average reception power $RP_{AVG}$. In this case as well, a unique wireless line usage rate UR independent of the distance L between the mobile station 10-the base station 20 can be obtained.

Then the control portion 13 executes a line usage rate dispersion processing based on the wireless line usage rates UR1 and UR2 (step S6).

Figure 6:
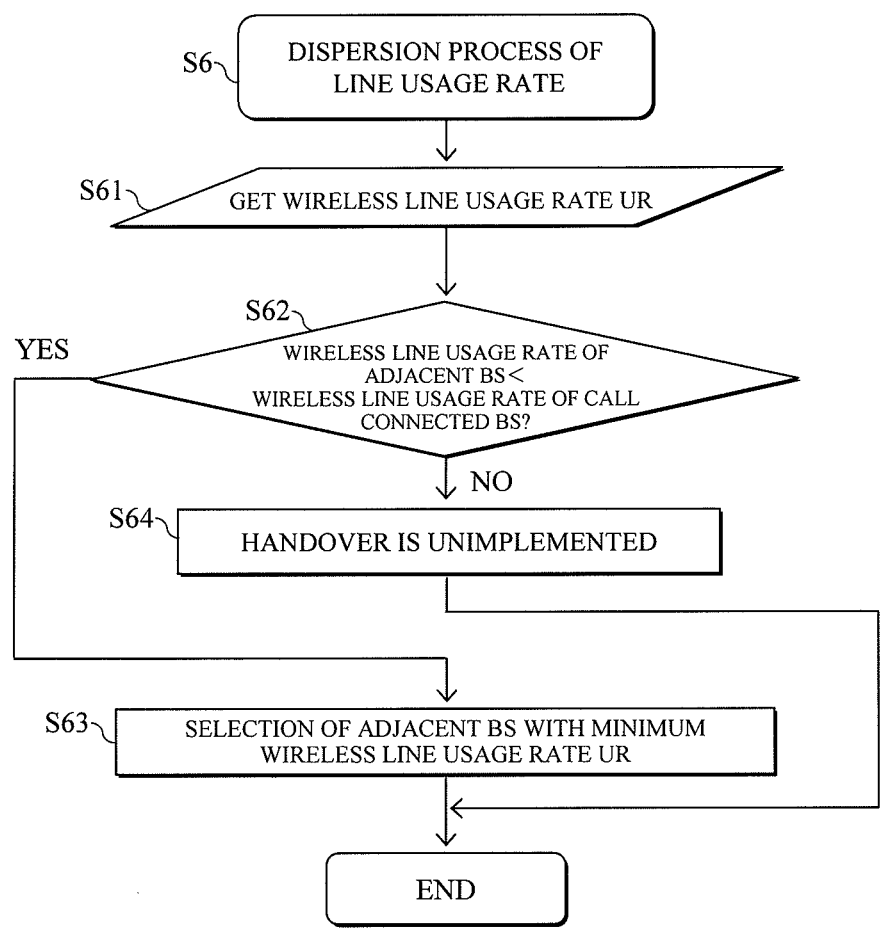
FIG. 6 is a flowchart depicting a line usage rate dispersion process in an embodiment [1] of a wireless line usage status monitoring method and device.

Namely, as depicted in FIG. 6, when having received the wireless line usage rates UR1 and UR2 (step S61), the control portion 13 determines whether or not the wireless line usage rate UR2 is lower than the wireless line usage rate UR1 (step S62).

Now assuming that "wireless line usage rate UR2<wireless line usage rate UR1" is established, the control portion 13 selects the base station 20_2 as a handover destination (step S63), where in the presence of a plurality of base stations of which wireless line usage rate is lower than the base station 20_1, the control portion 13 selects a base station of which wireless line usage rate is the lowest.

Meanwhile, at the above step S63, the control portion 13 may be adapted to select the base station 20_2 as a handover destination only if the wireless line usage rate UR2 is below a specified threshold value (not depicted) or the deference between the wireless line usage rate UR2 and the wireless line usage rate UR1 exceeds a specified threshold value (namely if the dispersion effect of the line usage rate is sufficiently achieved due to the handover to the base station 20_2).

On the other hand, if it is found by the determination at the above step S62 that there is no base station with the wireless line usage rate being lower than the base station 20_1, the control portion 13 executes no handover operation (step S64).

Then, the control portion 13 notifies a handover request REQ to the base station 20_1 during the call connection as depicted in FIG. 2 (step S7).

The base station 20_1 having received the handover request REQ notifies the mobile station 10 of the handover command CMD and permits the handover to the base station 20_2 (step S8), whereby the mobile station 10 is to be call connected to the base station 20_2 as depicted by dot and dash lines in FIG. 2.

Figure 16:
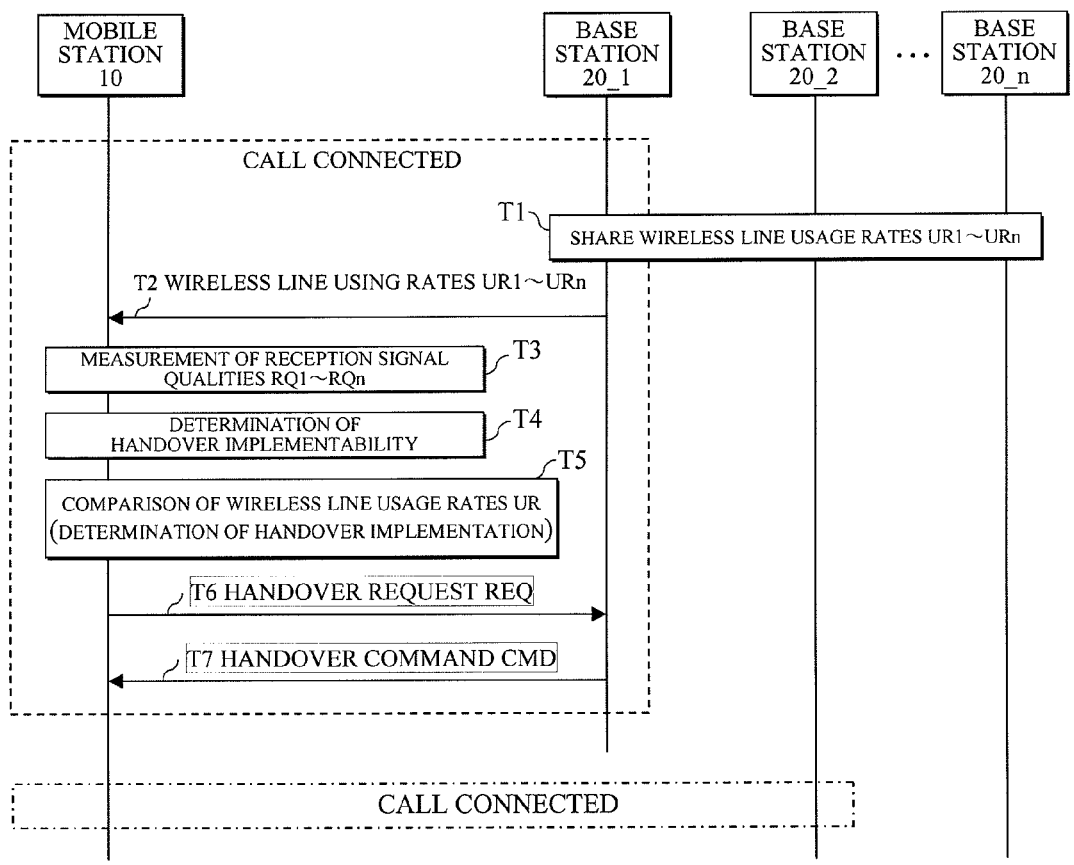
FIG. 16 is a sequence diagram depicting a related art example [1] with a wireless line usage status monitoring technology.
Figure 17:
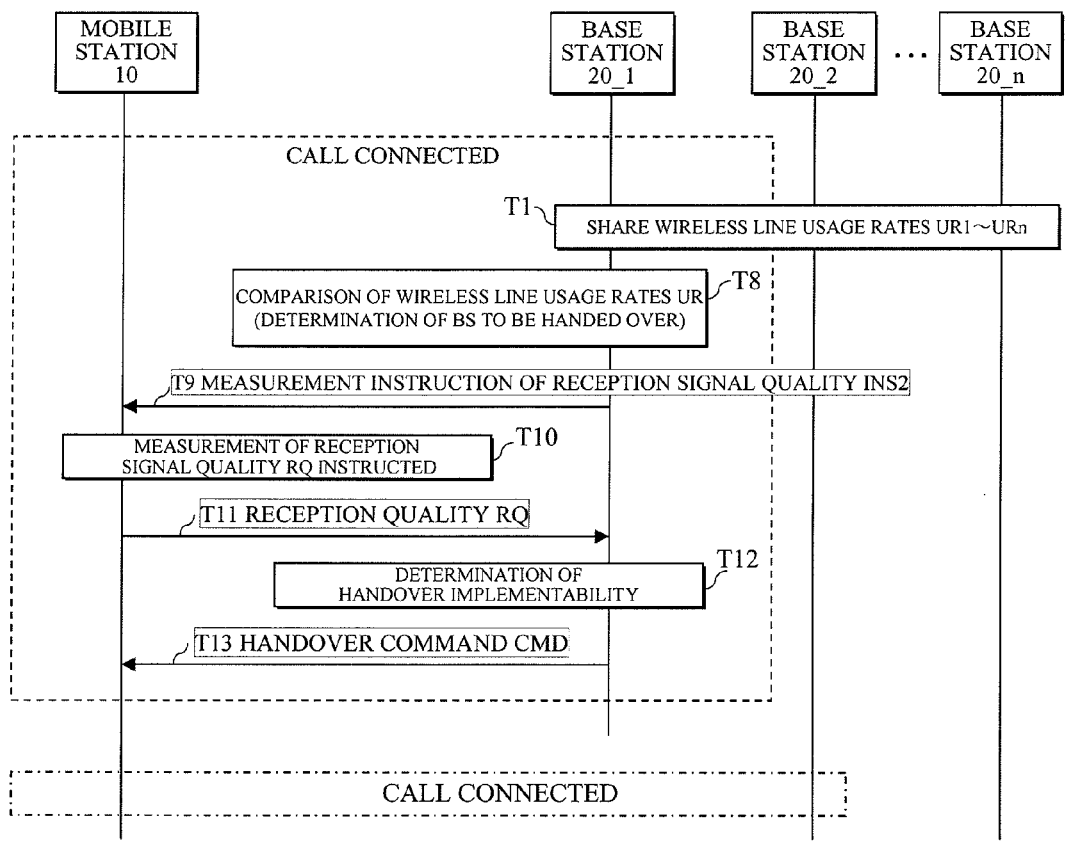
FIG. 17 is a sequence diagram depicting a related art [2] with a wireless line usage status monitoring technology.

Thus, without performing steps T1 and T2 depicted in FIG. 16 as a related art example (share of wireless line usage rates between the base stations and notification of wireless line usage rate to the mobile station), the wireless line usage status can be monitored.

Hereinafter, modification examples (1)-(3) will now be described referring to FIGS. 7-11.

Modification Example (1)

FIGS. 7-9

Figure 7:
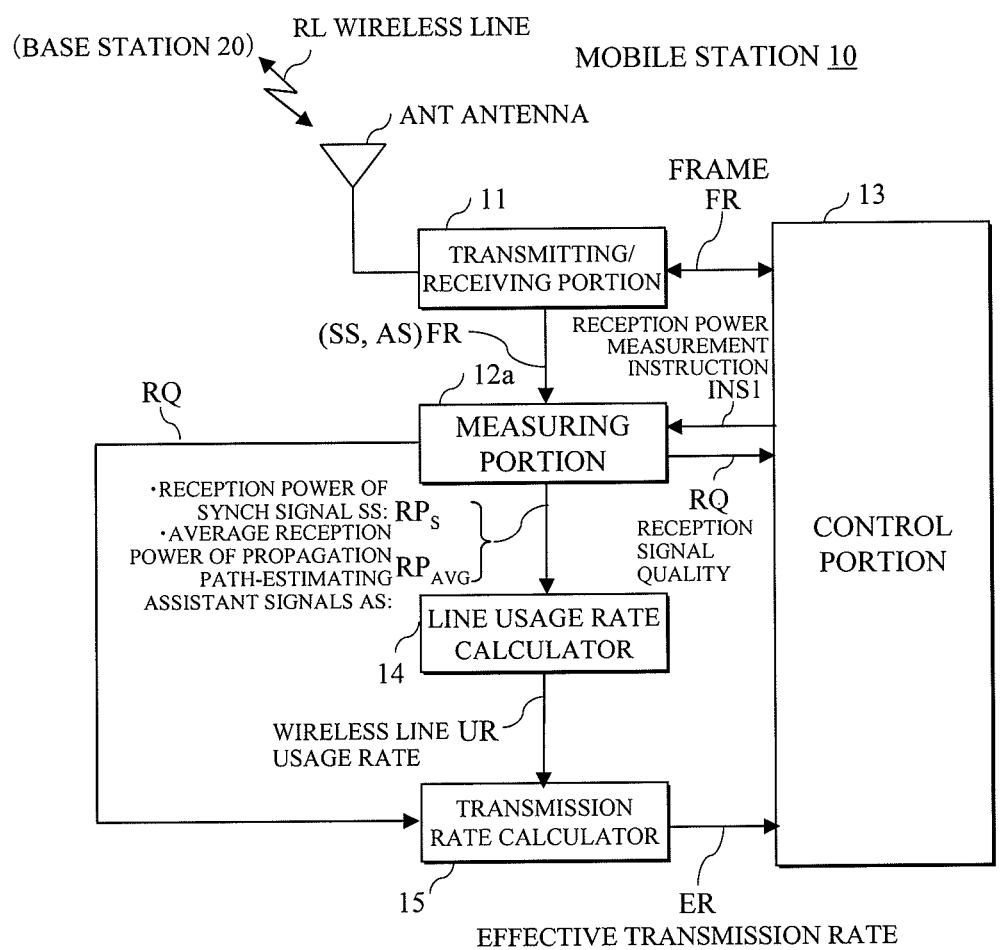
FIG. 7 is a block diagram depicting an arrangement of a modification example (1) of the embodiment [1]

The mobile station 10 depicted in FIG. 7 is provided, in addition to the arrangement depicted in FIG. 1, with a transmission rate calculator 15 for calculating an effective transmission rate ER of the wireless line RL based on the reception signal quality RQ and the wireless line usage rate UR respectively outputted from the measuring portion 12a and the line usage rate calculator 14.

Figure 8:
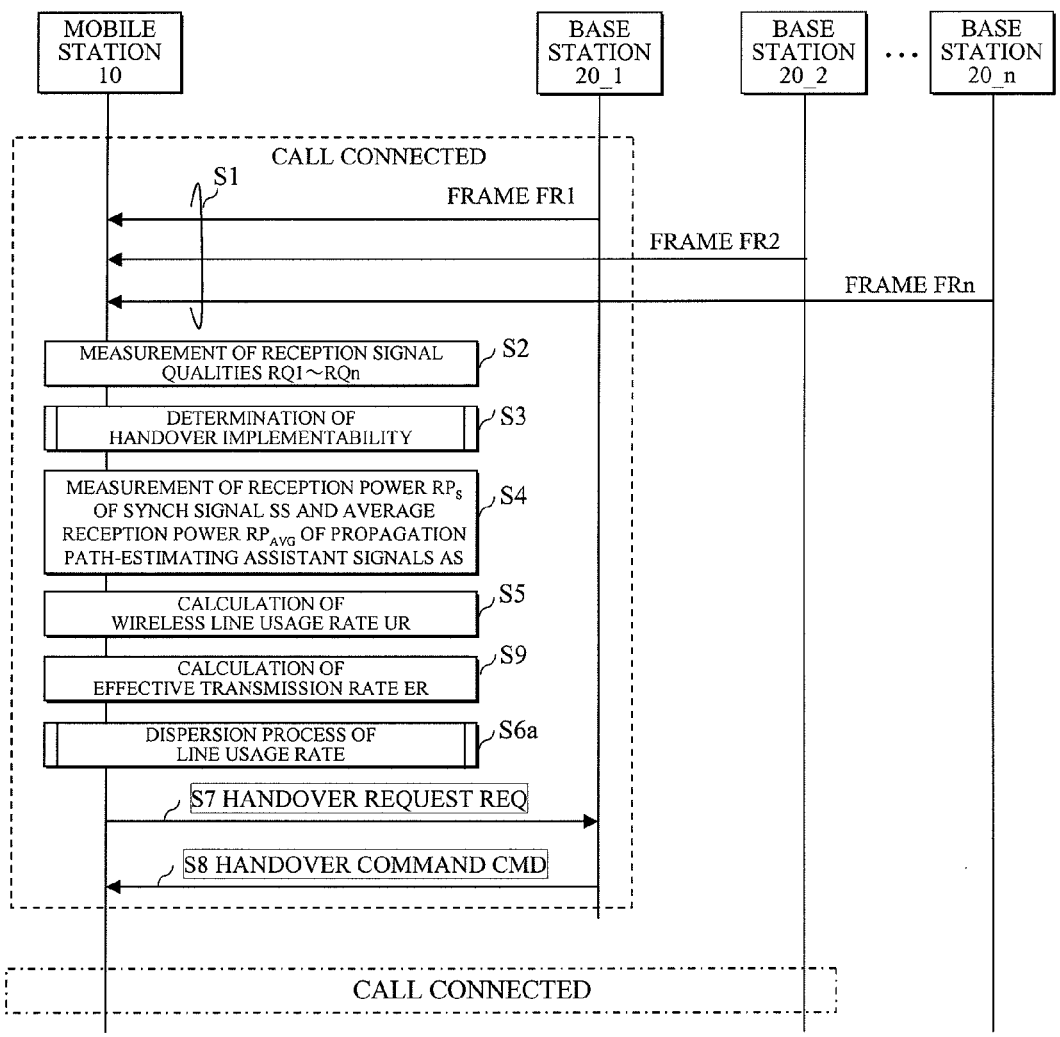
FIG. 8 is a sequence diagram depicting an operation of a modification example (1) of the embodiment [1]

FIG. 8 depicts an operation of the mobile station 10 in this modification example, where step S9 is newly added to the operation sequence depicted in FIG. 2, corresponding to which a line usage rate dispersion processing (step S6a) based on the effective transmission rate ER is substituted for the processing of step S6.

Namely, when the wireless line usage rate UR1 of the base station 20_1 and the wireless line usage rate UR2 of the base station 20_2 are calculated in the same manner as the above embodiment [1], the transmission rate calculator 15 calculates the wireless line effective transmission rate ER1 of the base station 20_1 from the wireless line usage rate UR1 and the reception signal quality RQ1 and calculates the wireless line effective transmission rate ER2 of the base station 20_2 from the wireless line usage rate UR2 and the reception signal quality RQ2, the effective transmission rates ER1 and ER2 being provided to the control portion 13 (step S9), as follows:

$$\text{effective transmission rate } ER1 = \text{maximum transmission rate } MR1 * (1 - \text{wireless usage rate } UR1) \quad \text{Eq. (3)}$$

$$\text{effective transmission rate } ER2 = \text{maximum transmission rate } MR2 * (1 - \text{wireless usage rate } UR2) \quad \text{Eq. (4)}$$

where the maximum transmission rates MR1 and MR2 of the above Equations (3) and (4) (hereinafter, occasionally represented by the maximum transmission rate MR) respectively correspond to the transmission rates at the time when the wireless line usage rates UR1 and UR2 are both "0". In case of an adaptive modulation system, this maximum transmission rate MR can be uniquely calculated (specified) from the reception signal quality RQ.

Also, "1-wireless line usage rate UR1" and "1-wireless line usage rate UR2" in the above Equations (3) and (4) respectively correspond to the wireless line usage rates of the base stations 20_1-20_2 (rate of the mobile station 10 capable of using the wireless line).

Then the control portion 13 executes the line usage rate dispersion processing based on the effective transmission rates ER1 and ER2 (step S6a).

Figure 9:
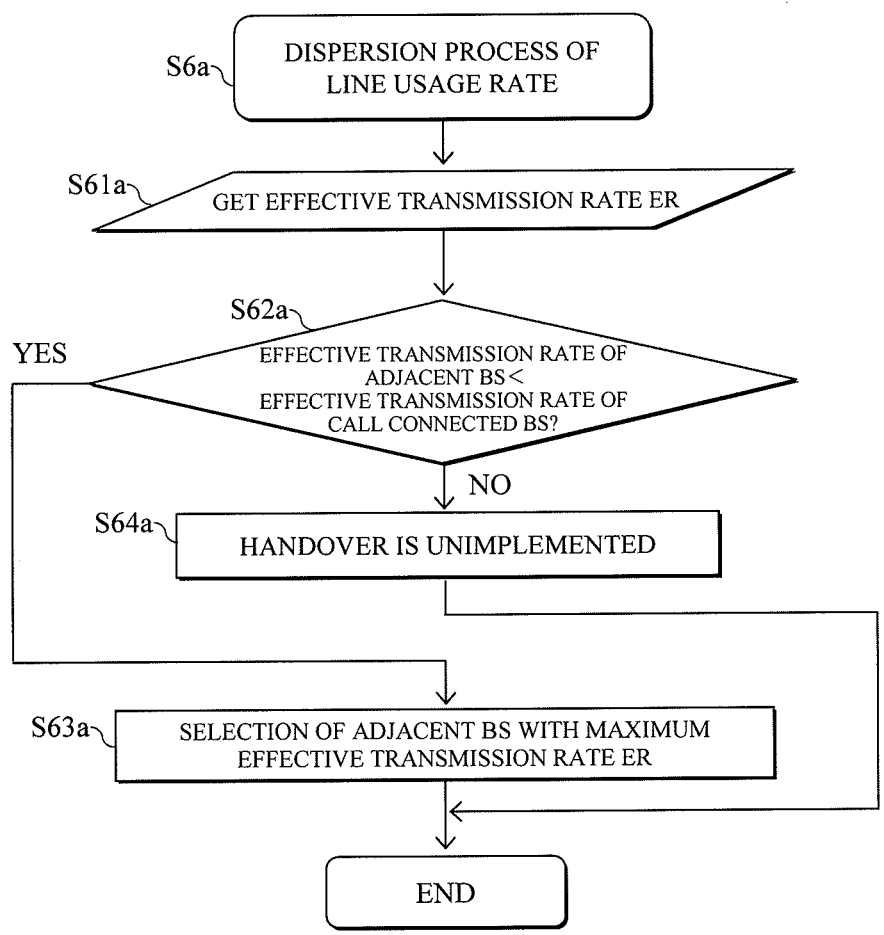
FIG. 9 is a flowchart depicting a line usage rate dispersion process example in a modification example (1) of the embodiment [1]

Namely, as depicted in FIG. 9, when having received the effective transmission rates ER1 and ER2 (step S61a), the control portion 13 determines whether or not the effective transmission rate ER2 is larger than the effective transmission rate ER1 (step S62a).

Now assuming that "the effective transmission rate ER2>the effective transmission rate ER1" be established, the control portion 13 selects the base station 20_2 as a handover destination (step S63a), where in the presence of a plurality of base stations with the effective transmission rate being larger than the base station 20_1, the control portion 13 selects the base station with the highest effective transmission rate as a handover destination.

Also in the above step S63a, the control portion 13 may be adapted to select the base station 20_2 as a handover destination only if the effective transmission rate ER2 exceeds a specified threshold level (not depicted) or the difference between the effective transmission rate ER2 and the effective transmission rate ER1 exceeds a specified threshold level (i.e. if the effective transmission rate ER2 sufficiently meets a transmission rate desired by the mobile station 10).

On the other hand, if it is found from the determination at the above step S62a that there exists no base station with the effective transmission rate being higher than the base station 20_1, the control portion 13 executes no handover operation (step S64a).

Hereinafter, by a mutual operation between the mobile station 10 and the base station 20_1 (steps S7 and S8 in FIG. 8), the mobile station 10 is to be call connected to the base station 20_2 as with the above embodiment [1].

Modification Example [2]

FIG. 10

Figure 10:
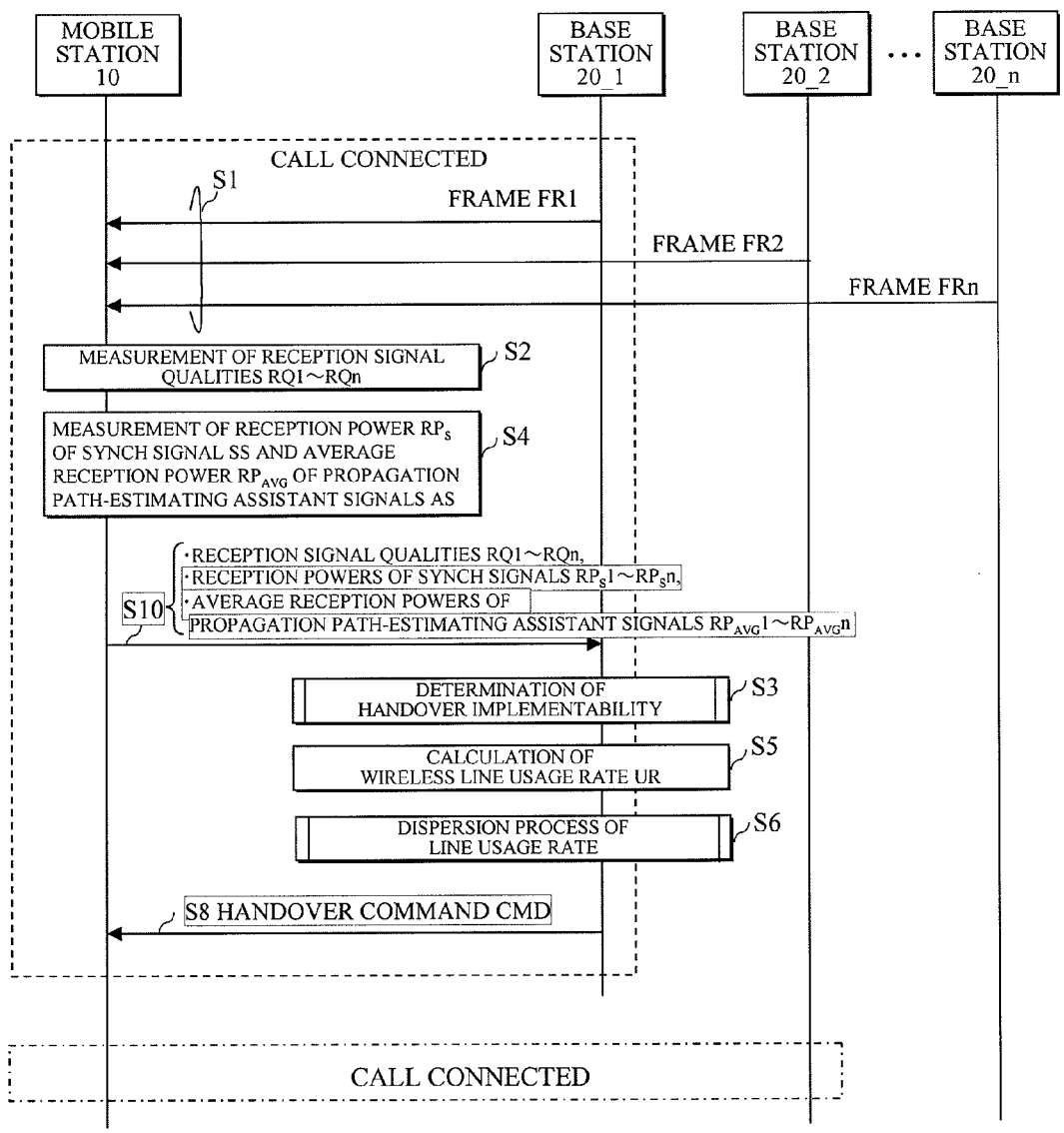
FIG. 10 is a sequence diagram depicting an operation of a modification example (2) of the embodiment [1]

FIG. 10 depicts a mutual operation between the mobile station 10 and the base station 20 in this modification example, in which the proceedings at steps S3, S5 and S6 in the operation sequence depicted in FIG. 2 are modified so as to be executed on the side of the base station 20, so that the handover destination of the mobile station 10 can be determined mainly led by the base station. In this case, it is necessary to provide blocks similar to the control portion 13 and the line usage rate calculator 14 depicted in FIG. 1 in the base station 20.

In operation, the mobile station 10 notifies the reception signal qualities RQ1-RQn, the reception powers $RP_S1$-$RP_Sn$ of the synchronizing signals within the frames FR1-FRn and the average reception powers $RP_{AVG}1$-$RP_{AVG}n$ of the propagation path-estimating assistant signals measured as with the above embodiment [1] to the base station 20_1 during the call connection (step S10).

Assuming that the base station 20_2 is selected as a handover destination as with the above embodiment [1] as a result that the base station 20_1 has executed the processings of steps S3, S5 and S6, the base station 20_1 gives the handover command to the mobile station 10 to be forcibly handed over to the base station 20_2 (step S8).

Modification Example (3)

FIG. 11

Figure 11:
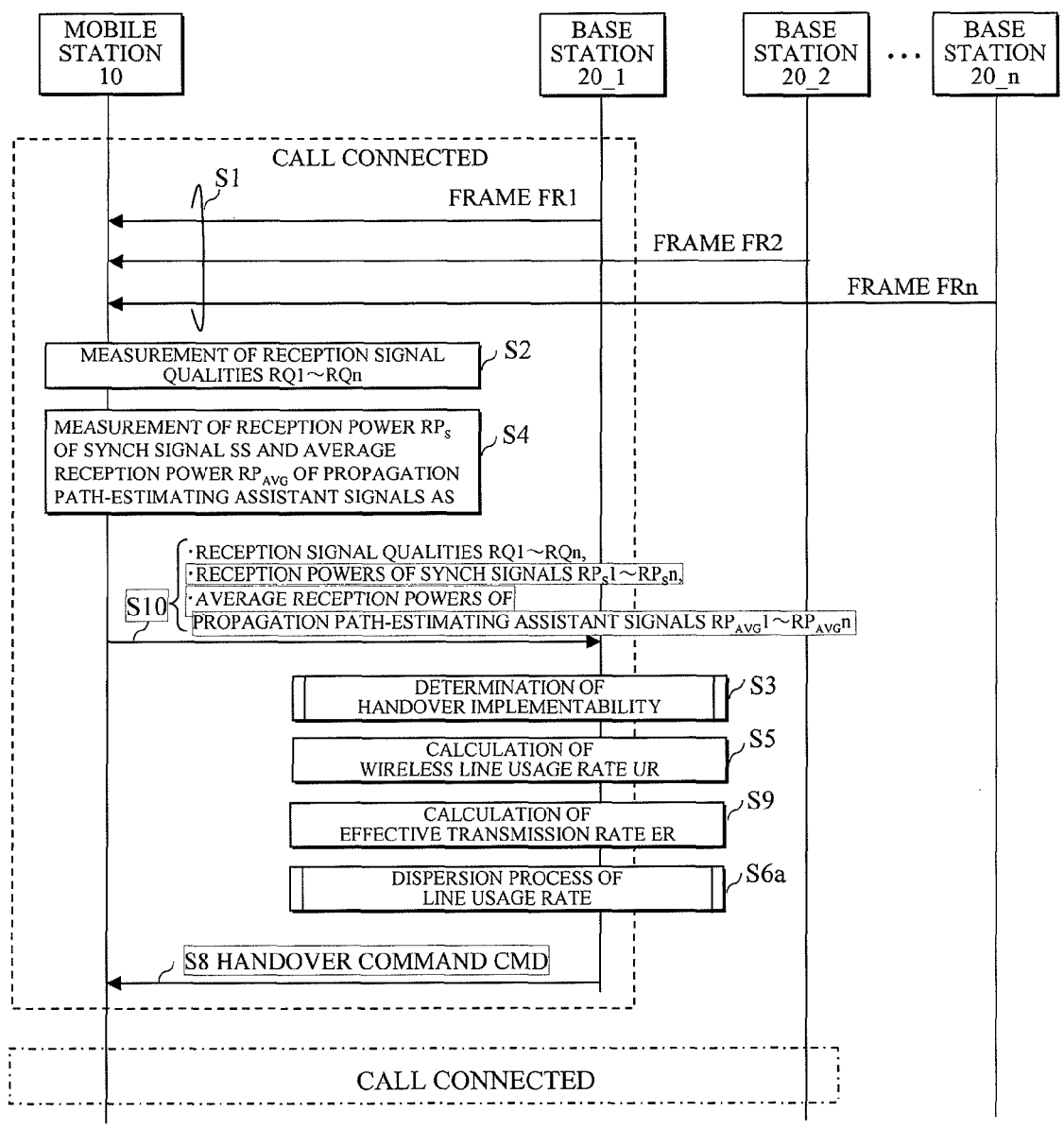
FIG. 11 is a sequence diagram depicting an operation of a modification example (3) of the embodiment [1]

FIG. 11 depicts a mutual operation between the mobile station 10 and the base station 20, which is, as depicted, modified to execute the processings of steps S3, S5, S9 and S6a in the operation sequence depicted in FIG. 8 on the side of the base station 20, so that the handover destination of the mobile station 10 can be determined mainly led by the base station based on the effective transmission rate ER.

In this case, it is necessary to provide blocks similar to the control portion 13, the wire usage rate calculator 14 and the transmission rate calculator 15 depicted in FIG. 7 in the base station 20.

Embodiment [2]

FIG. 12

Figure 12:
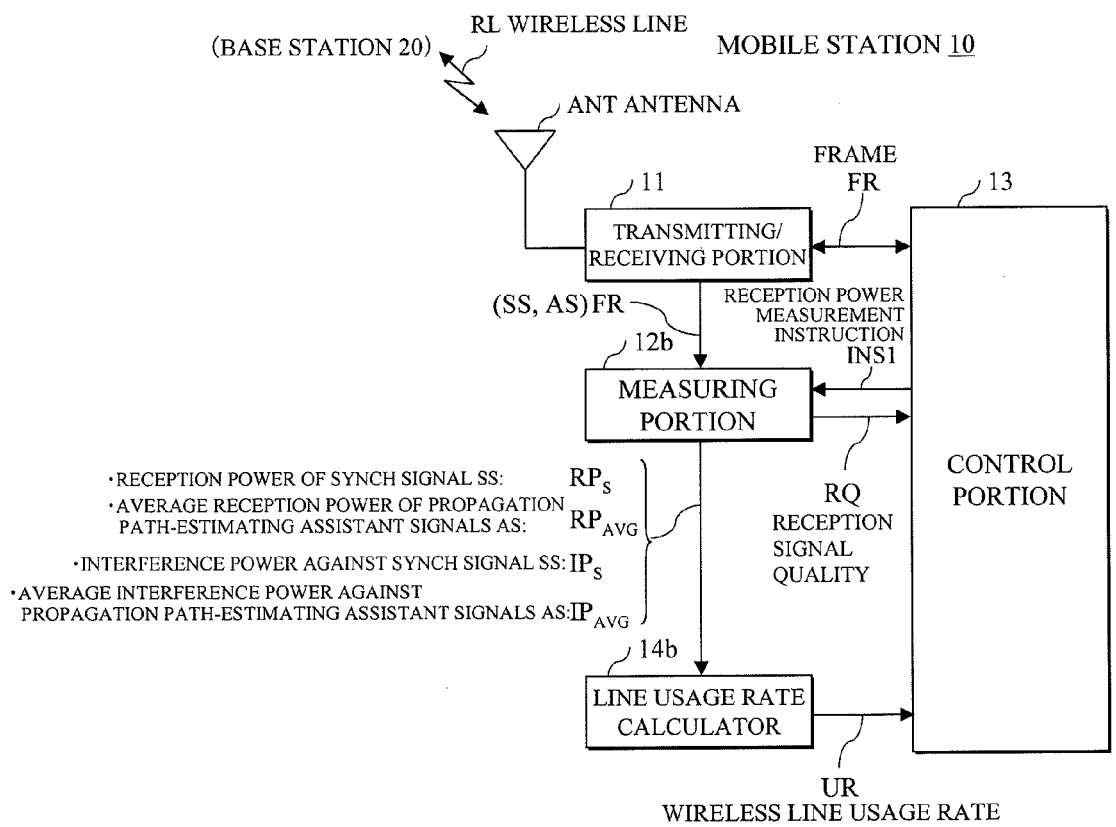
FIG. 12 is a block diagram depicting an arrangement of an embodiment [2] of a wireless line usage status monitoring method and device.
Figure 13:
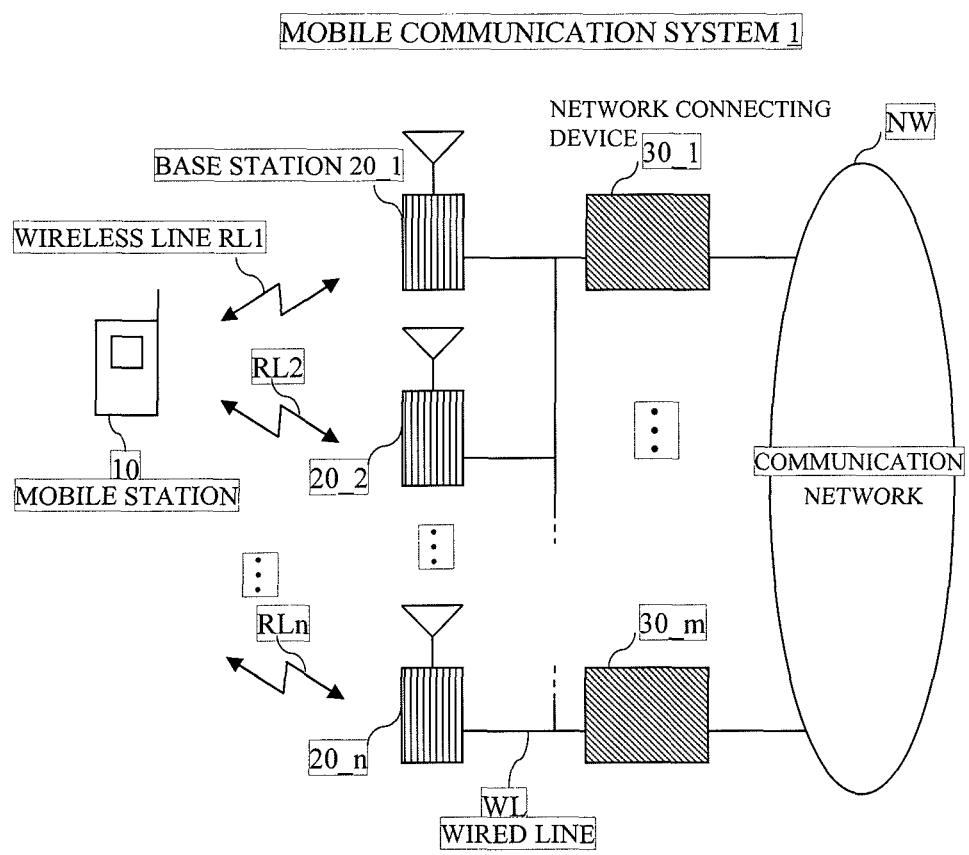
FIG. 13 is a block diagram depicting a general arrangement of a mobile communication system.

The mobile station 10 according to this embodiment [2] depicted in FIG. 12 employs a measuring portion 12b for measuring an interference power $IP_S$ with respect to the synchronizing signal SS and an average interference power $IP_{AVG}$ with respect to the propagation path-estimating assistant signals AS in addition to the reception signal quality RQ as well as the reception power $RP_S$ of the synchronizing signal SS and the average reception power $RP_{AVG}$ of the propagation path-estimating assistant signals AS within the frame FR and a line usage rate calculator 14b for calculating a wireless line usage rate UR indicating a usage status of the wireless line RL from those powers $RP_S$, $RP_{AVG}$, $IP_S$ and $IP_{AVG}$, instead of the measuring portion 12a and the line usage rate calculator 14 in the above embodiment [1], respectively.

Hereinafter, an operation of this embodiment will be described by taking as an example a case where the frames FR1-FRn are concurrently received from the base stations 20_1-20_n depicted in FIG. 2.

First, the control portion 13 executes the same handover implementability determination processing as the above embodiment [1] based on the wireless line reception signal qualities RQ1-RQn of the base stations 20_1-20_n. As a result, only when the base station as a handover candidate is determined, the control portion 13 provides the power measurement instruction INS1 to the measuring portion 12b to measure e.g. the reception power $RP_S$ of the synchronizing signal SS and the average reception power $RP_{AVG}$ of the propagation path-estimating assistant signals AS within the frame FR1 as well as the interference power $IP_S$ to the synchronizing signal AS and the average interference power $IP_{AVG}$ to the propagation path-estimating assistant signals AS.

It is to be noted that the above interference power $IP_S$ and the average interference power $IP_{AVG}$ respectively correspond to a total reception power of the synchronizing signals and a total of the average reception powers of the propagation path-estimating assistant signals within the frames FR2-FRn.

While calculating the wireless line usage rate UR1 of the base station 20_1 from the reception power $RP_S$ and the average reception power $RP_{AVG}$ in accordance with the above Equation (1), the line usage rate calculator 14b calculates a total wireless line usage rate $UR_{SUM}$ of the other base stations 20_2-20_n from the interference power $IP_S$ and the average interference power $IP_{AVG}$ in accordance with the following Equation (5):

$$\text{total wireless line usage rate } UR_{SUM} = \text{average interference power } IP_{AVG}/\text{interference power } IP_S \quad \text{Eq. (5)}$$

Now assuming that "total wireless line usage rate $UR_{SUM}$<wireless line usage rate UR1" be established, the control portion 13 determines to implement the handover to any of the base stations as the handover candidates. It is to be noted that the control portion 13 may be adapted to determine the handover implementation only if the total wireless line usage rate $UR_{SUM}$ is below a specified threshold value or the difference between the total wireless line usage rate $UR_{SUM}$ and the wireless line usage rate UR1 exceeds a specified threshold value (namely, if a dispersion effect of the wireless line usage rate can be sufficiently achieved by the handover).

Then the control portion 13 selects the base station with the best reception signal quality RQ from among the base station candidates to be handed over as a handover destination.

Thus, as with the above embodiment [1], it is possible to monitor the wireless line usage status without executing the processings of steps T1 and T2 depicted in FIG. 16 (share of the wireless line usage rates between the base stations and notification of the wireless line usage rate to the mobile station).

Also, since the synchronizing signal SS and the propagation path-estimating assistant signals AS are not measured for each base station, it is possible to shorten the calculation time for the wireless line usage rates.

In case where the present invention is applied to an OFDMA (Orthogonal Frequency Division Multiple Access) mobile communication system, the time slot may be replaced by a slot formed of time access and frequency access, including the propagation path-estimating assistant signals as well.

Also in the above modification examples (2) and (3), the mobile station may calculate the wireless line usage rate or the effective transmission rate to be notified to the base station during the call connection.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless line usage status monitoring method comprising:

extracting a synchronizing signal of each of frames received from a plurality of base stations and a known signal of a fixed power and a known pattern transmitted together with transmission data within a time slot in which the transmission data are included but not transmitted within a time slot in which the transmission data are not included;

measuring a reception power of the synchronizing signal and a reception power of the known signal for each base station;

determining a usage status of a wireless line of each base station based on the reception power of the synchronizing signal and the reception power of the known signal; and selecting a base station with the wireless line usage rate being lowest as a handover destination base station;

wherein the determining comprises calculating a wireless line usage rate as indicating the usage status from a ratio of the retention power of the synchronizing to the reception power of the known signal:

wherein the selecting selects, as the handover destination base station, a base station with the wireless line usage rate being lowest and lower than a specified value or a base station with the wireless line usage rate being lowest and with a wireless line usage rate difference with respect to a base station during a call connection exceeding a specified threshold value.

2. A wireless line usage status monitoring method comprising:

extracting a synchronizing signal of each of frames received from a plurality of base stations and a known signal of a fixed power and a known pattern transmitted together with transmission data within a time slot in which the transmission data are included but not transmitted within a time slot in which the transmission data are not included;

measuring a reception power of the synchronizing signal and a reception power of the known signal for each base station;

determining a usage status of a wireless line of each base station based on the reception power of the synchronizing signal and the reception power of the known signal;

measuring a wireless line reception signal quality for each base station;

calculating an effective transmission rate of each wireless line from the reception signal quality and the usage status; and selecting the base station with the effective transmission rate being highest as a handover destination base station;

wherein the selecting selects, as the handover destination base station, a base station with the effective transmission rate being highest and exceeding a specified threshold value or a base station with the effective transmission rate being highest and with an effective transmission rate difference with respect to a base station during a call connection exceeding a specified threshold value.

3. A wireless line usage status monitoring method comprising:

extracting, when frames are concurrently received from a plurality of base stations, a synchronizing signal of a frame received from one base station and a known signal of a fixed power and a known pattern transmitted together with transmission data within a time slot in which the transmission data are included but not transmitted within a time slot in which the transmission data are not included;

measuring a reception power of the synchronizing signal and a reception power of the known signal for each base station as well as an interference power with respect to the synchronizing signal and an interference power with respect to the known signal;

first determining a wireless line usage status of the one station based on the reception power of the synchronizing signal and the reception power of the known signal; and second determining a wireless line usage status of a second base station based on the interference power with respect to the synchronizing signal and the interference power with respect to the known signal;

wherein the first determining comprises calculating a wireless line usage rate of the one base station as indicating the wireless line usage status of the one base station from a ratio of the reception power of the synchronizing signal to the reception power of the known signal, and the second determining comprises calculating a wireless line usage rate of the second base station as indicating the wireless line usage status of the second base station from a ratio of the interference power with respect to the synchronizing signal to the interference power with respect to the known signal;

the method further comprising third measuring a wireless line reception signal quality of the second base station when the wireless line usage rate of the second base station is lower than the wireless line usage rate of the one base station; and selecting a base station with a best usage rate as a handover destination base station.

4. The wireless line usage status monitoring method as claimed in claim 3, wherein the third measuring measures the reception signal quality when the wireless line usage rate of the second base station is lower than the wireless line usage rate of the one base station and a difference between the usage rates exceeds a specified threshold value.

5. A wireless line usage status monitoring device comprising:

an extracting portion to extract a synchronizing signal of each of frames received from a plurality of base stations and a known signal of a fixed power and a known pattern transmitted together with transmission data within a time slot in which the transmission data are included but not transmitted within a time slot in which the transmission data are not included;

a measuring portion to measure a reception power of the synchronizing signal and a reception power of the known signal for each base station;

a determining portion to determine a usage status of a wireless line of each base station based on the reception power of the synchronizing signal and the reception power of the known signal; and a selecting portion to select a base station with the wireless line usage rate being lowest as a handover destination base station;

wherein the determining portion comprises a calculating portion to calculate a wireless line usage rate as indicating the usage status from a ratio of the reception power of the synchronizing signal to the reception power of the known signal;

wherein the selecting portion selects, as the handover destination base station, a base station with the wireless line usage rate being lowest and lower than a specified value or a base station with the wireless line usage rate being lowest and with a wireless line usage rate difference with respect to a base station during a call connection exceeding a specified threshold value.

* * * * *